(12) United States Patent
Awad Alla et al.

(10) Patent No.: US 10,737,666 B2
(45) Date of Patent: Aug. 11, 2020

(54) AUTOMOTIVE CONTROL

(71) Applicant: Ford Global Technologies, LLC, Dearborn, MI (US)

(72) Inventors: Michael Adel Awad Alla, Novi, MI (US); Cheri Lyn Hansen, Canton, MI (US); Jeffrey Yizhou Hu, Ann Arbor, MI (US); Joseph F. Stanek, Northville, MI (US); Douglas Scott Rhode, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 317 days.

(21) Appl. No.: 15/826,030

(22) Filed: Nov. 29, 2017

(65) Prior Publication Data

US 2019/0161063 A1    May 30, 2019

(51) Int. Cl.
| | | |
|---|---|---|
| *B60T 7/12* | (2006.01) | |
| *B60T 7/02* | (2006.01) | |
| *B60T 7/14* | (2006.01) | |
| *G05D 1/00* | (2006.01) | |

(52) U.S. Cl.
CPC ........ *B60T 7/12* (2013.01); *B60T 7/02* (2013.01); *B60T 7/14* (2013.01); *G05D 1/0016* (2013.01); *B60T 2220/00* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,150,200 B2 | 10/2015 | Urhahne | |
| 9,195,256 B2 | 11/2015 | Robbins et al. | |
| 9,495,874 B1* | 11/2016 | Zhu et al. | G08G 1/166 |
| 9,720,419 B2 | 8/2017 | O'Neill et al. | |
| 2010/0286845 A1 | 11/2010 | Rekow et al. | |
| 2017/0102712 A1 | 4/2017 | Nijam | |

FOREIGN PATENT DOCUMENTS

| | | |
|---|---|---|
| EP | 1004230 B1 | 8/2006 |
| GB | 2534471 A | 7/2016 |

OTHER PUBLICATIONS

H Scientific Inc. entitled "Joystick Remote Control".
Edelstein article entitled "Tesla Adds Safety Provisions to 'Summon' Self Driving Feature," Green Car Reports dated Feb. 16, 2016.

\* cited by examiner

*Primary Examiner* — Abdhesh K Jha
(74) *Attorney, Agent, or Firm* — Frank A. MacKenzie; Bejin Bieneman PLC (57) ABSTRACT

A system includes a switch biased to a neutral position, a camera, and a computer communicatively coupled to the switch and the camera. The computer is programmed to activate a vehicle brake upon receiving data from the switch that the switch is in the neutral position and to activate the vehicle brake upon determining that an operator of the switch is in an inattentive state based on data received from the camera.

13 Claims, 5 Drawing Sheets

AUTOMOTIVE CONTROL

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention. The vehicle may operate in one or more of the levels of autonomous vehicle operation. According to the above definitions of this disclosure, therefore, nonautonomous modes of operation may refer to levels 0-1, semi-autonomous modes of operation may refer to levels 2-3, and fully autonomous modes of operation may refer to levels 4-5.

Fully autonomous vehicles may be manufactured without vehicle controls, e.g., a steering wheel, an accelerator pedal, a brake pedal, etc. Even for fully autonomous vehicles, situations can exist in which manual control of the vehicle by an operator is useful, for example, a service technician moving a vehicle around a repair shop. In those situations, the service technician may be outside the vehicle. It is therefore a problem that a vehicle may omit manual controls, i.e., controls for steering and speed and/or that a user may not be able to exercise control outside the vehicle.

DETAILED DESCRIPTION

The system described below reliably provides for external manual control of a fully autonomous vehicle. The system includes an input device separate or separable from the vehicle and a camera of the vehicle. The input device includes a switch biased to a neutral position. The system utilizes this hardware, with checks from both the input device and the vehicle camera, to prevent movement of the vehicle if, for example, the operator of the vehicle becomes incapacitated. This solution is particularly useful in the context of manual control of fully autonomous vehicles.

The system includes a switch biased to a neutral position, a camera, and a computer communicatively coupled to the switch and the camera and programmed to activate a vehicle brake upon receiving data from the switch that the switch is in the neutral position and to activate the vehicle brake upon determining that an operator of the switch is in an inattentive state based on data received from the camera.

The computer may be further programmed to determine that the operator of the switch is in an inattentive state based on one of an absence of the operator from a designated position relative to a field of view of the camera, eyes of the operator remaining closed for longer than a first threshold duration, and a head of the operator deviating from an upright position for longer than a second threshold duration.

The system may include a vehicle including the computer, the camera, and the vehicle brake. The camera may be aimed at a location outside the vehicle. The vehicle may include a plurality of seats, and the camera may be aimed at one of the seats. The vehicle may lack a steering wheel, an accelerator pedal, and a brake pedal.

The switch may be movable to an active position, and the computer may be further programmed to deactivate the vehicle brake upon receiving data from the switch that the switch is in the active position and that the operator of the switch is in an attentive state.

The system may include an input device including the switch, and the input device may include a capacitive sensor communicatively coupled to the computer, and the computer may be further programmed to activate the vehicle brake upon receiving data indicating an absence of a conductor contacting the capacitive sensor. The capacitive sensor may be on the input device and spaced from the switch. The capacitive sensor may be disposed on the switch.

A computer includes a processor programmed to activate a vehicle brake upon receiving data from a switch that the switch is in a neutral position, the switch being biased to the neutral position, and activate the vehicle brake upon determining that an operator of the switch is in an inattentive state.

The processor may be further programmed to determine that the operator of the switch is in an inattentive state based on one of an absence of the operator from a designated position relative to a field of view of a camera, eyes of the operator remaining closed for longer than a first threshold duration, and a head of the operator deviating from an upright position for longer than a second threshold duration.

The processor may be further programmed to deactivate the vehicle brake upon receiving data from the switch that the switch is in an active position and that the operator of the switch is in an attentive state.

The processor may be further programmed to activate the vehicle brake upon receiving data from a capacitive sensor included on an input device including the switch, the data indicating an absence of a conductor contacting the capacitive sensor.

A method includes activating a vehicle brake upon receiving data from a switch that the switch is in a neutral position, the switch being biased to the neutral position, and activating the vehicle brake upon determining that an operator of the switch is in an inattentive state.

The method may further include determining that the operator of the switch is in an inattentive state based on one of an absence of the operator from a designated position relative to a field of view of a camera, eyes of the operator remaining closed for longer than a first threshold duration, and a head of the operator deviating from an upright position for longer than a second threshold duration.

The method may further include deactivating the vehicle brake upon receiving data from the switch that the switch is in an active position and that the operator of the switch is in an attentive state.

The method may further include activating the vehicle brake upon receiving data from a capacitive sensor included on an input device including the switch, the data indicating an absence of a conductor contacting the capacitive sensor.

Figure 1:
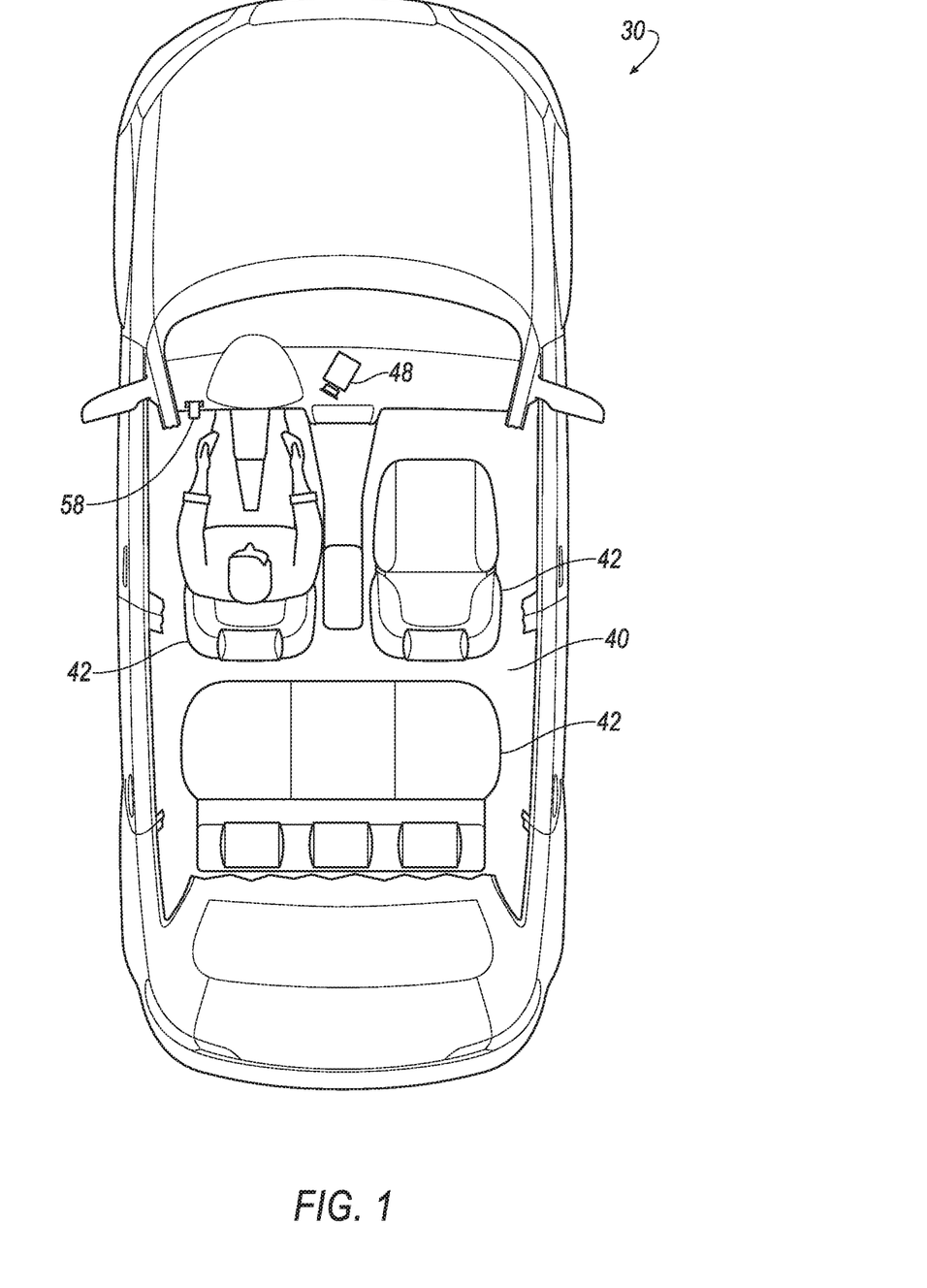
FIG. 1 is a top view of an example vehicle with a roof removed for illustration.
Figure 2:
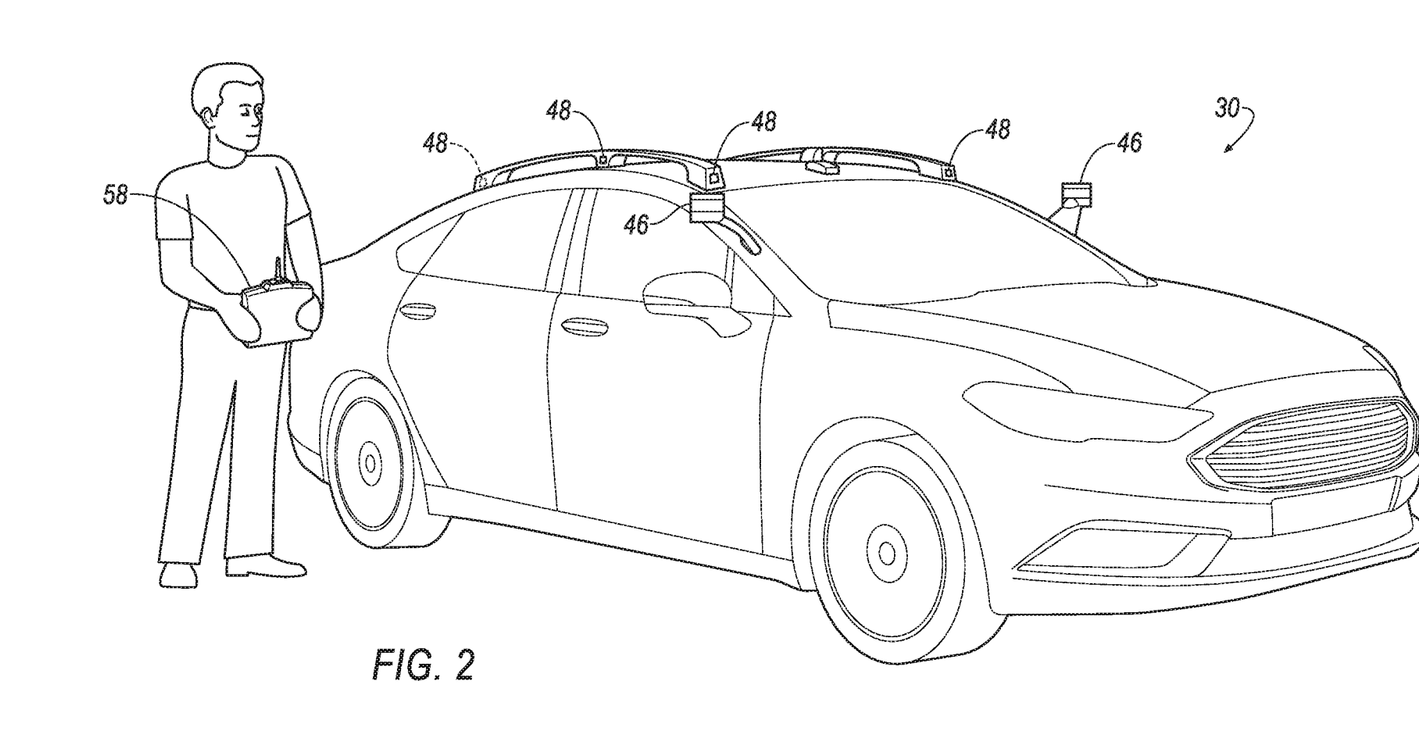
FIG. 2 is a perspective view of another example vehicle.
Figure 3:
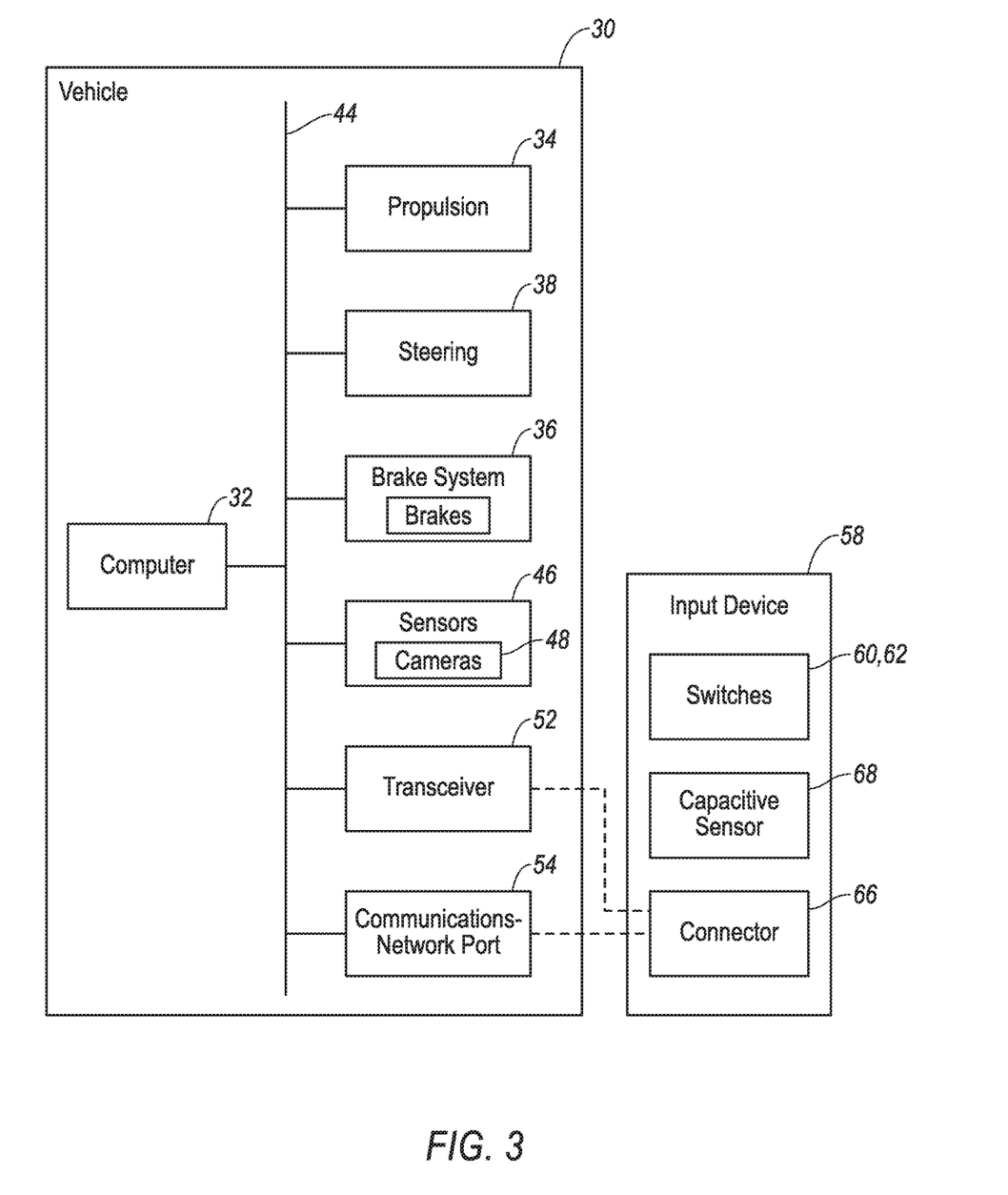
FIG. 3 is a block diagram of an example control system for the vehicle of FIG. 1 or 2.

With reference to FIGS. 1-3, a vehicle 30 is an autonomous or semi-autonomous vehicle. A computer 32 can be configured to operate the vehicle 30 independently of the intervention of a human driver, completely or to a lesser degree. The computer 32 may be programmed to operate a propulsion 34, a brake system 36, a steering 38, and/or other vehicle systems. For the purposes of this disclosure, autonomous operation means the computer 32 controls the propulsion 34, brake system 36, and steering 38; semi-autonomous operation means the computer 32 controls one or two of the propulsion 34, brake system 36, and steering 38, and a human driver controls the remainder; and nonautonomous operation means the human driver controls the propulsion 34, brake system 36, and steering 38. The vehicle 30 may lack a steering wheel, accelerator pedal, and/or brake pedal.

With reference to FIGS. 1 and 2, the vehicle 30 includes a passenger cabin 40 to house occupants, if any, of the vehicle 30. The vehicle 30 includes a plurality of seats 42. For example, the passenger cabin 40 may include one or more front seats 42 disposed at a front of the passenger cabin 40 and one or more back seats 42 disposed behind the front seats 42. The passenger cabin 40 may also include third-row seats 42 (not shown) at a rear of the passenger cabin 40. The position and orientation of the seats 42 and components thereof may be adjustable by an occupant.

With reference to FIG. 3, the computer 32 is a microprocessor-based computer. The computer 32 includes a processor, memory, etc. The memory of the computer 32 includes memory for storing instructions executable by the processor as well as for electronically storing data and/or databases.

The computer 32 may transmit and receive data through a communications network 44 such as a controller area network (CAN) bus, Ethernet, WiFi, Local Interconnect Network (LIN), onboard diagnostics connector (OBD-II), and/or by any other wired or wireless communications network. The computer 32 may be communicatively coupled to the propulsion 34, the brake system 36, the steering 38, sensors 46, 48, a transceiver 52, a communications-network port 54, and other components via the communications network 44.

The propulsion 34 of the vehicle 30 generates energy and translates the energy into motion of the vehicle 30. The propulsion 34 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 34 can include an electronic control unit (ECU) or the like that is in communication with and receives input from the computer 32 and/or a human driver. The human driver may control the propulsion 34 via, e.g., an accelerator pedal and/or a gear-shift lever, if present.

The brake system 36 is typically a known vehicle braking subsystem and resists the motion of the vehicle 30 to thereby slow and/or stop the vehicle 30. The brake system 36 includes brakes 56, which may be friction brakes such as disc brakes, drum brakes, band brakes, etc.; regenerative brakes; any other suitable type of brakes; or a combination. The brake system 36 can include an electronic control unit (ECU) or the like that is in communication with and receives input from the computer 32 and/or a human driver. The human driver may control the brake system 36 via, e.g., a brake pedal, if present.

The steering 38 is typically a known vehicle steering subsystem and controls the turning of the wheels. The steering 38 may be a rack-and-pinion system with electric power-assisted steering, a steer-by-wire system, as both are known, or any other suitable system. The steering 38 can include an electronic control unit (ECU) or the like that is in communication with and receives input from the computer 32 and/or a human driver. The human driver may control the steering 38 via, e.g., a steering wheel, if present.

With reference to FIGS. 1-3, the sensors 46, 48 may provide data about operation of the vehicle 30, for example, wheel speed, wheel orientation, and engine and transmission data (e.g., temperature, fuel consumption, etc.). The sensors 46, 48 may detect the location and/or orientation of the vehicle 30. For example, the sensors 46, 48 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46, 48 may detect the external world, e.g., objects and/or characteristics of surroundings of the vehicle 30, such as other vehicles, road lane markings, traffic lights and/or signs, pedestrians, etc. For example, the sensors 46, 48 may include radar sensors, scanning laser range finders, light detection and ranging (LIDAR) devices, and image processing sensors such as cameras 48.

The cameras 48 may be distributed in or on the vehicle 30 and aimed externally, i.e., at the external world, and/or internally, i.e., in the passenger cabin 40. One of the cameras 48 may be used for tracking an operator of the vehicle 30, e.g., a service technician using an input device 58 (described below). The one of the cameras 48 that is being used to track an operator is referred to as an "operator-tracking camera." The camera 48 tracking the operator may be aimed at one of the seats 42, as shown in FIG. 1, if the operator uses the input device 58 from in the passenger cabin 40. Alternatively or additionally, the camera 48 tracking the operator may be aimed at a location outside the vehicle 30, as shown in FIG. 2, if the operator uses the input device 58 from outside the vehicle 30. FIG. 2 shows the operator using the input device 58 at a location behind and beside the vehicle 30.

With reference to FIG. 3, the transceiver 52 may be adapted to transmit signals wirelessly through any suitable wireless communication protocol, such as Bluetooth®, WiFi, IEEE 802.11a/b/g, other RF (radio frequency) communications, etc. The transceiver 52 may be adapted to communicate with a remote server, that is, a server distinct and spaced from the vehicle 30. The remote server may be located outside the vehicle 30. For example, the remote server may be the input device 58, or may be associated with other vehicles (e.g., V2V communications), infrastructure components (e.g., V2I communications via Dedicated Short-Range Communications (DSRC) or the like), emergency responders, mobile devices associated with the owner of the vehicle 30, etc. The transceiver 52 may be one device or may include a separate transmitter and receiver.

The communications-network port 54 allows an external device such as the input device 58 to be directly connected to, e.g., plugged into, the communications network 44. The type of the communications-network port 54 can be any suitable port for a physical, i.e., wired, connection to the network 44 and typically depends on the type of communications network 44. For example, if the communications network 44 is a CAN bus, the communications-network port 54 may be a 9-pin D-sub female connector. For another example, if the communications network 44 is an OBD-II, the communications-network port 54 may be a 16-pin D-shaped female connector.

Figure 4:
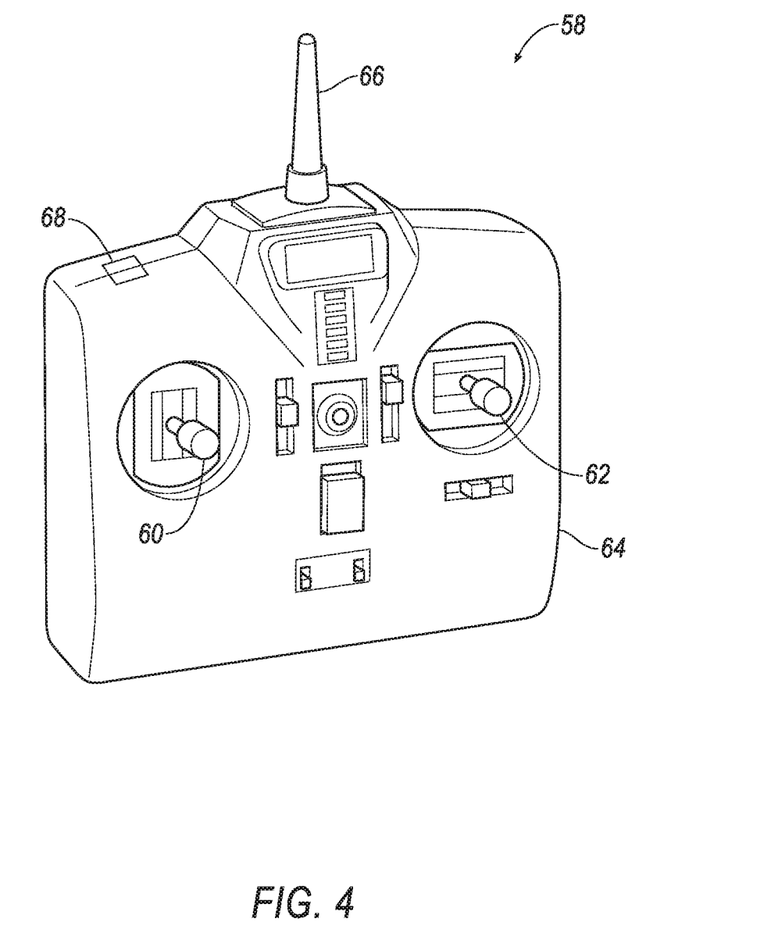
FIG. 4 is a perspective view of an example input device for the vehicle of FIG. 1 or 2.

With reference to FIGS. 3 and 4, the input device 58 allows a human operator to operate the vehicle 30, e.g., control the propulsion 34, brake system 36, and steering 38. For example, the input device 58 may include a first switch 60 oriented vertically for controlling the propulsion 34 and brake system 36 and a second switch 62 oriented horizontally for controlling the steering 38. (The adjectives "first" and "second" are used throughout this document as identifiers and are not intended to signify importance or order.) The switches 60, 62 may be movable relative to a housing 64 of the input device. The housing 64 covers and contains internal components of the input device 58. The input device 58 may be sized to be a handheld device by the operator.

The input device 58 is separate from the vehicle 30, and the input device 58 may or may not be detachably attachable to the vehicle 30. The input device 58 includes a connector 66 to communicate with the communications network 44, either through the transceiver 52 or the communications-network port 54. For example, the connector 66 may be an antenna able to transmit and receive on the wavelengths that the transceiver 52 uses, as shown in FIG. 4. For another example, the connector 66 may be a male plug compatible with the communications-network port 54 (not shown).

The switches 60, 62 may each be movable along one dimension. For example, the switches 60, 62 may be lever-shaped and movable by tilting about a rotational axis. Each switch 60, 62 is movable between a neutral position and one or more active positions. For example, the first switch 60 may be movable from a neutral position to a forward active position, which instructs the propulsion 34 to accelerate. The degree of forward tilt from the neutral position may request a desired speed of the vehicle 30, or any tilt to the forward active position may request a constant low speed. The first switch 60 may be movable from the neutral position to a backward active position, which instructs the propulsion 34 to accelerate in reverse. The degree of backward tilt from the neutral position may request a desired speed of the vehicle 30 in reverse, or any tilt to the forward active position may request a constant low speed in reverse. The first switch 60 in the neutral position requests application of the brakes 56 and no acceleration. For another example, the second switch 62 may be movable from a neutral position, which requests the steering 38 orient the wheels straight forward, to a left active position, which requests the steering 38 turn the wheels left, or to a right active position, which requests the steering 38 turn the wheels right.

The switches 60, 62 each include a position sensor (not shown) such as a rotary encoder or linear encoder, which translates the physical position of the switch 60, 62 into an electrical signal representing the physical position. The electrical signal from the position sensor of the first switch 60 may take on the values forward, neutral, and reverse, or may take on one of several values depending on the degree of the tilt of the first switch 60. The electrical signal from the position sensor of the second switch 62 may take on the values left, centered, and right, or may take on one of several values depending on the degree of the tilt of the second switch 62. The input device 58 sends the values of the electrical signals of the position sensors for the switches 60, 62 to the computer 32 via the connector 66.

The switches 60, 62 are biased to the neutral position, i.e., when no pressure is applied to the switches 60, 62, the switches 60, 62 move to the neutral positions (sometimes called a "deadman switch"). For example, a spring (not shown) may be attached to one of the switches 60, 62 and to the housing 64, and the spring may be relaxed when the switch 60, 62 is in the neutral position and stretched or compressed when the switch 60, 62 is an active position.

The input device 58 may include a capacitive sensor 68. The capacitive sensor 68 is positioned to be touched by a hand of the operator who is grasping the input device 58. For example, the sensor may be disposed on the switch 60, 62. For another example, the capacitive sensor 68 is on the input device 58 and spaced from the switch 60, 62, such as at a top of the input device 58 where a finger of the operator will rest. The capacitive sensor 68 may be any suitable type of sensor that detects changes in an electric field caused by proximity to human skin, e.g., a surface capacitive sensor, a projected capacitive touch sensor such as a mutual capacitive sensor or a self-capacitive sensor, etc. The capacitive sensor 68 is communicatively coupled to the computer 32 via the connector 66 and either the transceiver 52 or the communications-network port 54.

Figure 5:
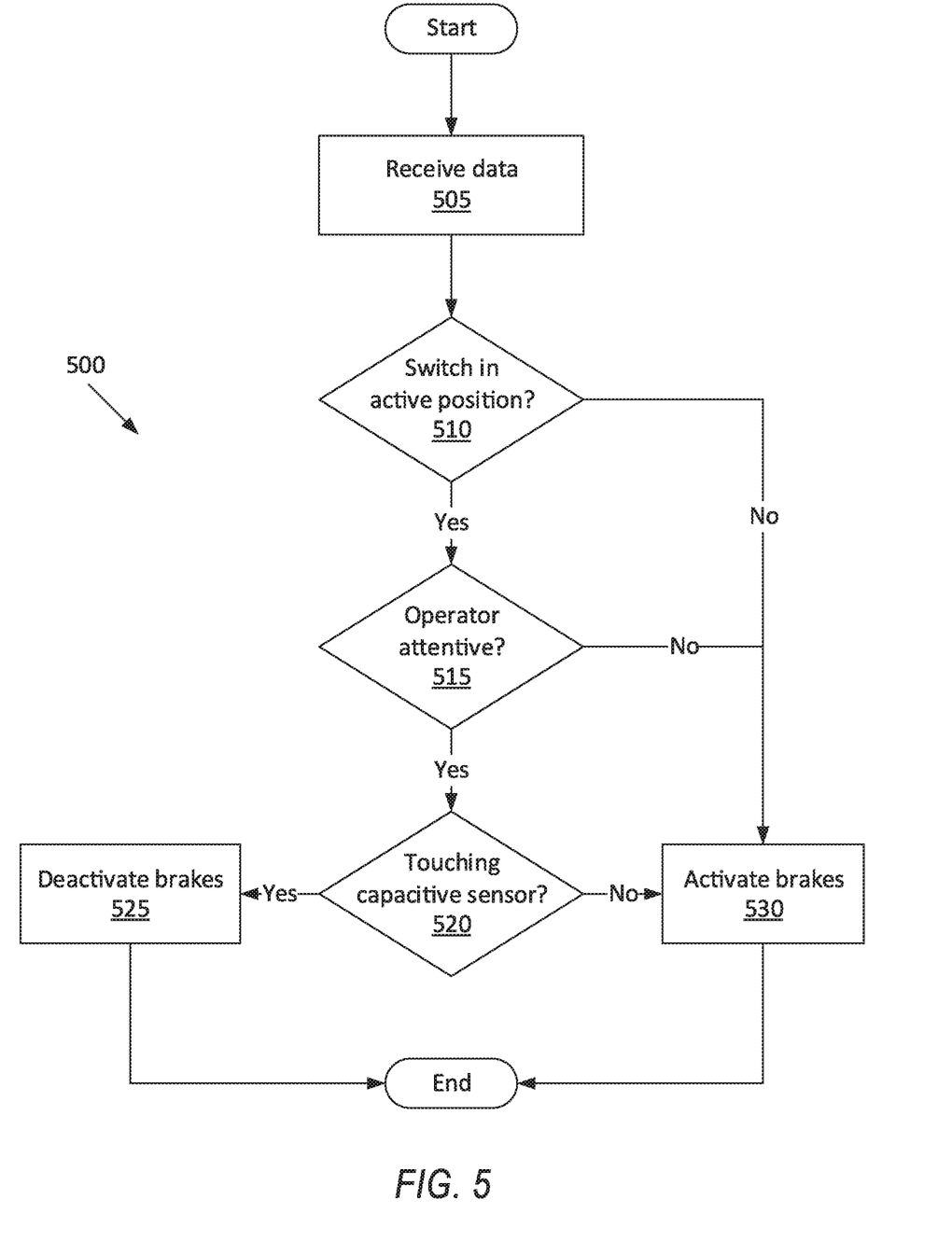
FIG. 5 is a process flow diagram of an example process for instructing the vehicle of FIG. 1 or 2 to move.

FIG. 5 is a process flow diagram illustrating an exemplary process 500 for operating the vehicle 30. The memory of the computer 32 stores executable instructions for performing the steps of the process 500. In general, the process 500 activates the brakes 56 if the operator becomes incapacitated, inattentive, or absent, which may be determined if the first switch 60 reverts to the neutral position, the face and eyes of the operator are not visible to one of the cameras 48 and oriented upright, and/or the operator is not touching the capacitive sensor 68. In many implementations, a determination that the operator is incapacitated, inattentive, or absent requires just one of determining that the first switch 60 reverts to the neutral position, the face and eyes of the operator are not visible to one of the cameras 48 and oriented upright, or the operator is not touching the capacitive sensor 68, thereby preventing an operator from "tricking" the system by satisfying one but not all of these conditions, e.g., using a rubber band or other biasing mechanism to bias a switch 60 away from its default or "deadman" position.

The process 500 begins in a block 505, in which the computer 32 receives data from the input device 58 and from the operator-tracking camera 48. The computer 32 receives the data from the input device 58 via the connector 66 and either the transceiver 52 or communications-network port 54. The data from the input device 58 includes the positions of the switches 60, 62 (as represented in the electrical signal from the positions sensors of the switches 60, 62) and an electrical measurement from the capacitive sensor 68. The data from the operator-tracking camera 48 is digital image or video data.

Next, in a decision block 510, the computer 32 determines whether the first switch 60 is in one of the active positions based on the data received from the input device 58. If the first switch 60 is in the neutral position, the process 500 proceeds to a block 530.

If the first switch 60 is in one of the active positions, next, in a decision block 515, the computer 32 determines whether the operator of the input device 58 is in an attentive or an inattentive state. The computer 32 may determine that the operator is in an attentive state based on the operator being in a designated position relative to a field of view of the operator-tracking camera 48, with the operator's head in an upright position and the operator's eyes open and visible to one of the cameras 48. The designated position may be chosen so that the operator can see where the vehicle 30 is traveling while the face of the operator is visible to one of the cameras 48. The designated position may be in one of the seats 42, as shown in FIG. 1, or a location outside the vehicle 30 such as behind and beside the vehicle 30, as shown in FIG. 2. The computer 32 may determine that the operator of the input device 58 is in an inattentive state, e.g., because the operator is incapacitated, daydreaming, etc., based on an absence of the operator from the designated position relative to a field of view of the one of the cameras 48, based on eyes of the operator remaining closed for longer than a first threshold duration, or based on a head of the operator deviating from an upright position for longer than a second threshold duration. The computer 32 may use known object-recognition techniques to recognize the body, head, and/or eyes of the operator, based on comparing the images to baseline images prestored in the memory of the computer 32. If the operator is in an inattentive state, the process 500 proceeds to the block 530.

If the operator is in an attentive state, next, in a decision block 520, the computer 32 determines whether the operator is touching the capacitive sensor 68. The electrical measurement from the capacitive sensor 68 is compared to a threshold indicating a conductor touching the capacitive sensor 68. If there is an absence of a conductor touching the capacitive sensor 68, the process 500 proceeds to the block 530.

If a conductor is touching the capacitive sensor 68, next, in a block 525, the computer 32 instructs the brakes 56 to deactivate, allowing the vehicle 30 to move forward or in reverse. In other words, the computer 32 deactivates the brakes 56 upon receiving data that the first switch 60 is in one of the active positions, that the operator of the input device 58 is in the attentive state, and that the operator is touching the capacitive sensor 68. After the block 525, the process 500 ends.

The process 500 proceeds to a block 530 after the decision block 510 if the first switch 60 is in the neutral position, after the decision block 515 if the operator is in an inattentive state, or after the decision block 520 if there is an absence of a conductor touching the capacitive sensor 68. In the block 530, the computer 32 activates the brakes 56. Thus, if any of the first switch 60, the operator-tracking camera 48, or the capacitive sensor 68 has provided data to result in a determination that the operator is inattentive, incapacitated, or absent, the vehicle 30 is prevented from moving. Alternatively, as discussed above, the computer 32 could determine in this block whether any one or two of the foregoing conditions are met. After the block 530, the process 500 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   an input device including a switch and a capacitive sensor, wherein the switch is biased to a neutral position, and wherein the capacitive sensor is on the input device and spaced from the switch;
   a camera; and
   a computer communicatively coupled to the switch, the capacitive sensor, and the camera and programmed to activate a vehicle brake upon receiving data from the switch that the switch is in the neutral position, to activate the vehicle brake upon receiving data indicating an absence of a conductor contacting the capacitive sensor, and to activate the vehicle brake upon determining that an operator of the switch is in an inattentive state based on data received from the camera.

2. The system of claim 1, wherein the computer is further programmed to determine that the operator of the switch is in an inattentive state based on one of an absence of the operator from a designated position relative to a field of view of the camera, eyes of the operator remaining closed for longer than a first threshold duration, and a head of the operator deviating from an upright position for longer than a second threshold duration.

3. The system of claim 1, further comprising a vehicle including the computer, the camera, and the vehicle brake.

4. The system of claim 3, wherein the camera is aimed at a location outside the vehicle.

5. The system of claim 3, wherein the vehicle includes a plurality of seats, and the camera is aimed at one of the seats.

6. The system of claim 3, wherein the vehicle lacks a steering wheel, an accelerator pedal, and a brake pedal.

7. The system of claim 1, wherein the switch is movable to an active position, and the computer is further programmed to deactivate the vehicle brake upon receiving data from the switch that the switch is in the active position and that the operator of the switch is in an attentive state.

8. A computer comprising a processor programmed to:
   activate a vehicle brake upon receiving data from a switch that the switch is in a neutral position, the switch being biased to the neutral position;
   activate the vehicle brake upon determining that an operator of the switch is in an inattentive state; and
   activate the vehicle brake upon receiving data from a capacitive sensor included on an input device including the switch, the data indicating an absence of a conductor contacting the capacitive sensor;
   wherein the capacitive sensor is on the input device and spaced from the switch.

9. The computer of claim 8, wherein the processor is further programmed to determine that the operator of the switch is in an inattentive state based on one of an absence of the operator from a designated position relative to a field of view of a camera, eyes of the operator remaining closed for longer than a first threshold duration, and a head of the operator deviating from an upright position for longer than a second threshold duration.

10. The computer of claim 8, wherein the processor is further programmed to deactivate the vehicle brake upon receiving data from the switch that the switch is in an active position and that the operator of the switch is in an attentive state.

11. A method comprising:
    activating a vehicle brake upon receiving data from a switch that the switch is in a neutral position, the switch being biased to the neutral position;
    activating the vehicle brake upon determining that an operator of the switch is in an inattentive state; and
    activating the vehicle brake upon receiving data from a capacitive sensor included on an input device including the switch, the data indicating an absence of a conductor contacting the capacitive sensor;
    wherein the capacitive sensor is on the input device and spaced from the switch.

12. The method of claim 11, further comprising determining that the operator of the switch is in an inattentive state based on one of an absence of the operator from a designated position relative to a field of view of a camera, eyes of the operator remaining closed for longer than a first threshold duration, and a head of the operator deviating from an upright position for longer than a second threshold duration.

13. The method of claim 11, further comprising deactivating the vehicle brake upon receiving data from the switch that the switch is in an active position and that the operator of the switch is in an attentive state.

* * * * *